United States Patent
Wong et al.

(10) Patent No.: US 9,359,126 B2
(45) Date of Patent: *Jun. 7, 2016

(54) SYSTEM, METHOD AND CAPSULE FOR PREPARING A BEVERAGE

(75) Inventors: Kon Euan Gerard Wong, Burwood East (AU); Guido Brandt, Bentleigh East (AU); Hendrik Cornelis Koeling, Amersfoort (NL); Ralf Kamerbeek, De Meern (NL); Arend Cornelis Jacobus Biesheuvel, Werkendam (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,607

(22) Filed: Dec. 12, 2011

(65) Prior Publication Data

US 2012/0251668 A1    Oct. 4, 2012

Related U.S. Application Data (63) Continuation of application No. PCT/NL2009/050831, filed on Dec. 30, 2009.

(30) Foreign Application Priority Data

Jun. 17, 2009    (EP) .................................... 09162994

(51) Int. Cl.
*A47J 31/06*    (2006.01)
*B65D 85/804*    (2006.01)

(52) U.S. Cl.
CPC ......... *B65D 85/8043* (2013.01); *A47J 31/0673* (2013.01)

(58) Field of Classification Search
CPC ... A47J 31/02; A47J 31/0642; A47J 31/0668; A47J 31/0673; A47J 31/3623; A47J 31/3628; B65D 85/804; B65D 85/816; B65D 85/8043

USPC ....................... 99/295, 323; 426/77, 115, 433
See application file for complete search history.

(56) References Cited

U.S. PATENT DOCUMENTS 3,615,708 A    10/1971   Abile-Gal
4,321,139 A    3/1982    Auclair
(Continued)

FOREIGN PATENT DOCUMENTS

BE    1 015 694    7/2005
DE    69205232 T2    3/1996
(Continued)

OTHER PUBLICATIONS

Chinese Office Action and Search Report and Translation thereof for Chinese Application No. 200980160986.6, dated Jun. 26, 2013, 17 pages.
(Continued)

*Primary Examiner* — Dana Ross
*Assistant Examiner* — Lindsey C. Teaters
(74) *Attorney, Agent, or Firm* — Foley & Lardner LLP (57) ABSTRACT

A system, method and capsule for preparing a predetermined quantity of beverage suitable for consumption using an extractable product includes an exchangeable capsule, and an apparatus including a receptacle for holding the exchangeable capsule, and a fluid dispensing device for supplying a fluid to the exchangeable capsule. The exchangeable capsule includes a circumferential wall, a bottom, and a lid. The wall, bottom and lid enclose an inner space including the extractable product. The bottom includes an entrance layer for supplying an amount of a fluid by the fluid dispensing device through the entrance layer to the capsule. The lid includes an exit layer for supplying a prepared beverage through the exit layer from the capsule to a container. The capsule includes an additional wall element extending towards the inner space for providing additional stiffness.

17 Claims, 4 Drawing Sheets

(56) References Cited

U.S. PATENT DOCUMENTS

| | | |
|---|---|---|
| 4,417,504 A | 11/1983 | Yamamoto |
| 4,859,337 A | 8/1989 | Woltermann |
| 5,242,702 A | 9/1993 | Fond |
| 5,325,765 A | 7/1994 | Sylvan et al. |
| 5,840,189 A | 11/1998 | Sylvan et al. |
| D408,679 S | 4/1999 | Potts et al. |
| 6,079,315 A | 6/2000 | Beaulieu et al. |
| 6,082,247 A | 7/2000 | Beaulicu |
| 6,142,063 A | 11/2000 | Beaulieu et al. |
| 6,182,554 B1 | 2/2001 | Beaulieu et al. |
| D452,433 S | 12/2001 | Lazaris |
| D452,434 S | 12/2001 | Sweeney |
| 6,440,256 B1 | 8/2002 | Gordon et al. |
| D462,865 S | 9/2002 | Honan et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| D489,215 S | 5/2004 | Honan et al. |
| D502,362 S | 3/2005 | Lazaris et al. |
| D513,572 S | 1/2006 | Schaffeld et al. |
| 7,165,488 B2 | 1/2007 | Bragg et al. |
| D544,299 S | 6/2007 | Schaffeld et al. |
| D554,299 S | 10/2007 | Ragonetti et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,513,192 B2 | 4/2009 | Sullivan et al. |
| 7,523,695 B2 | 4/2009 | Streeter et al. |
| 7,543,527 B2 | 6/2009 | Schmed |
| 7,552,672 B2 | 6/2009 | Schmed |
| 7,640,845 B2 | 1/2010 | Woodnorth et al. |
| 7,856,920 B2 | 12/2010 | Schmed et al. |
| 8,850,960 B2 * | 10/2014 | Biesheuvel et al. ......... 99/289 R |
| 2004/0045443 A1 | 3/2004 | Lazaris et al. |
| 2005/0051478 A1 | 3/2005 | Karanikos et al. |
| 2005/0205601 A1 | 9/2005 | Taylor |
| 2005/0287251 A1 | 12/2005 | Lazaris et al. |
| 2006/0174773 A1 | 8/2006 | Taylor |
| 2006/0236871 A1 | 10/2006 | Ternite et al. |
| 2006/0292012 A1 | 12/2006 | Brudevold et al. |
| 2007/0114685 A1 | 5/2007 | Wardrop et al. |
| 2007/0196402 A1 | 8/2007 | De La Mettrie et al. |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2010/0024658 A1 | 2/2010 | Jacobs et al. |
| 2010/0303964 A1 | 12/2010 | Beaulieu et al. |

FOREIGN PATENT DOCUMENTS

| | | |
|---|---|---|
| EP | 1 398 279 A2 | 3/2004 |
| EP | 1 710 173 A1 | 10/2006 |
| EP | 1 900 653 B1 | 3/2008 |
| JP | 2005-536271 | 12/2005 |
| WO | WO-2004/018326 | 3/2004 |
| WO | WO-2007/114685 | 10/2007 |
| WO | WO-2008/117329 | 10/2008 |
| WO | WO-2008/136026 A1 | 11/2008 |
| WO | WO-2009/110783 A2 | 9/2009 |
| WO | WO-2010/016753 A1 | 2/2010 |

OTHER PUBLICATIONS

Japanese Office Action and Translation thereof for Japanese Application No. 2012-516016, dated Jul. 8, 2013, 7 pages.
International Search Report for PCT/NL2009/050831, mailing date Mar. 1, 2010, 3 pages.
Decision of Rejection for Japanese Patent Application No. 2012-516016, dated Jun. 25, 2014, with English translation, 5 pages.
Patent Examination Report No. 1 for Australian patent Application No. 2009347084, dated Jul. 8, 2014, 3 pages.
Notice of Preliminary Rejection with English Translation for Korean Patent Application No. 10-2014-7018466, issued Sep. 25, 2014, 12 pages.
English-language machine translation of DE 69205232, Nestle SA (Mar. 14, 1996).
Opposition filed with European Patent Office against EP App. No. 09796485.2, 20 pages. (Jan. 28, 2016).
Bayer MaterialScience, Part and Mold Design (Thermoplastics): A Design Guide, 174 pages. (2000).
DuPont Technische Kunststoffe, 153 pages (2002).
Multifab, Inc., "Thermoforming Design Guidelines," Revision Jun. 4, 2009, 42 pages (2009).
Ehrenstein, G.W. et al., Werkstoff- und prozessoptimierte Herstellung flachiger Kunststoff-Kunststoff und Kunststoff-Metall-Verbundbauteile, 30 pages (2003).

* cited by examiner

SYSTEM, METHOD AND CAPSULE FOR PREPARING A BEVERAGE

CROSS-REFERENCE TO RELATED APPLICATIONS

The present application is a continuation of International Patent Application Ser. No. PCT/NL2009/050831 filed on Dec. 30, 2009 (which is hereby incorporated herein by reference); which claimed priority to European Application No. EP09162994.9 filed on Jun. 17, 2009 (which is hereby incorporated herein by reference).

BACKGROUND

The invention relates to a system for preparing a predetermined quantity of beverage suitable for consumption using an extractable product, comprising an exchangeable capsule, and an apparatus comprising a receptacle for holding the exchangeable capsule, and a fluid dispensing device for supplying an amount of a fluid, such as fluid, under pressure to the exchangeable capsule, wherein the exchangeable capsule comprises a circumferential wall, a bottom closing the circumferential wall at a first end, and a lid closing the circumferential wall at a second end opposite the bottom, wherein the wall, bottom and lid enclose an inner space comprising the extractable product, wherein the bottom comprises an entrance area and the system is arranged for bringing the fluid dispensing device in fluid connection with the entrance area for supplying the fluid to the extractable product for preparing the beverage, and wherein the lid comprises an exit area and the system comprises an outlet which, in use, is in fluid communication with the exit area for draining the prepared beverage from the capsule and supplying the beverage to a container such as a cup.

Such systems are known per se. The capsule of such a system may have a substantially soft wall, thereby rendering the capsule susceptible for environmental influences. For example, the capsule may be damaged and/or deformed during transport, handling and/or use. Also, the reproducibility of the prepared beverage may be poor, due to e.g. deformation during use under influence of the fluid pressure.

SUMMARY

It is an object of the invention to improve the above system, and more specifically to at least diminish one of the above problems.

Thereto, according to the invention, a system is provided for preparing a predetermined quantity of beverage suitable for consumption using an extractable product, comprising an exchangeable capsule, and an apparatus comprising a receptacle for holding the exchangeable capsule, and a fluid dispensing device for supplying an amount of a fluid, such as water, under pressure to the exchangeable capsule, wherein the exchangeable capsule comprises a circumferential wall, a bottom closing the circumferential wall at a first end, and a lid closing the circumferential wall at a second end opposite the bottom, wherein the wall, bottom and lid enclose an inner space comprising the extractable product, wherein the bottom comprises an entrance area and the system is arranged for bringing the fluid dispensing device in fluid connection with the entrance area for supplying the fluid to the extractable product for preparing the beverage, wherein the lid comprises an exit area and the system comprises an outlet which, in use, is in fluid communication with the exit area for draining the prepared beverage from the capsule and supplying the beverage to a container such as a cup, wherein the receptacle is arranged for draining the prepared beverage from the capsule through the exit area, wherein the capsule comprises at least one additional wall element extending towards the inner space for providing additional stiffness.

By providing an additional wall element in the capsule, extending towards the inner space of the capsule, the wall comprising the wall element may be additionally reinforced, thereby reducing damage and/or deformation during handling, use and/or transport of the capsule. The bottom may comprise an additional wall element and/or the lid may comprise an additional wall element and/or the circumferential wall may comprise an additional wall element. By providing additional stiffness to the capsule by means of an additional wall element, the reproducibility of the capsule may improve because the capsule may be less deformable under influence of fluid pressure.

By providing a substantially rigid circumferential wall, the capsule becomes a substantially rigid capsule instead of a substantially soft capsule. By providing a substantially rigid capsule with an additional wall element, the substantially rigid capsule may be reinforced more. Also, the wall may become more thin because stiffness may also be provided by the additional wall element.

By providing an additional wall element that extends from the bottom to the lid of the capsule, the additional wall element may be a stiffening rib. The rib may be configured such that it also provides e.g. a flow resistance to the fluid entering the capsule and thereby aiding the pressure build up in the capsule. In particular, the pressure may be built up in the capsule until the pressure is sufficiently high for providing a relatively optimal prepared beverage. Also, the quality of the prepared beverage may be more reproducible.

In an embodiment, the rib may be configured wedge-shaped with an increasing cross-section from bottom to lid for providing flow resistance to the fluid entering the capsule, thereby providing a more controlled pressure built up in the capsule.

In an embodiment, the additional wall element comprises a bore at an end facing the bottom for letting fluid therein. Also, the additional wall element may comprise perforate and/or porous sides for letting fluid there through. By providing an additional wall element with an opening for letting fluid in and e.g. a plurality of openings for letting fluid through, the fluid may be directed to specific areas of the capsule. The pressure build-up and the brewing process may be improved and may be controlled more. Also, the reproducibility of the pressure built up and/or of the prepared beverage may improve.

In an embodiment, the additional wall element divides the inner space of the capsule into two or more compartments. The compartments may provide additional stiffness and/or rigidity to the capsule. Different compartments may comprise different extractable product and/or different compositions of extractable product and/or different compaction of extractable product. For example, there may be two compartments provided of which one compartment is filled with extractable product such as roasted and ground coffee and of which one compartment remains empty. This way, the external dimensions of the capsule may be provided such that the capsule fits appropriately in the receptacle. In the inner space a compartment may be provided that is sufficiently large to contain the extractable product in an optimal compaction, so an optimal pressure built up may be obtained.

In a further embodiment, different compartments may comprise different products, e.g different extractable products such as coffee or tea and/or different soluble products, such as milk or cacao. For example, one compartment may comprise coffee, a second compartment may comprise amaretto and a third compartment may comprise cream. Also different compartments may comprise different melanges of roasted and ground coffee. The pressure built up in the compartments may be different to provide e.g. a particularly composed prepared beverage. For example the pressure in a first compartment may be built up to a lower level than the pressure in a second compartment, so that the extractable product in the first compartment is delivered first to the cup and the extractable product in the second compartment is delivered later to the cup.

In a compartment comprising a soluble product, a stir arrangement or a disturbing arrangement may be provided to create a disturbance such as a swirl or a vortex or otherwise a disturbance in the flow in the compartment to optimally dissolve the soluble product. The disturbing arrangement may for example be a grid or a vane or a spiral structure or a labyrinth-like structure or a tree-like structure or otherwise a structure that disturbs the flow in the compartment. The disturbing arrangement preferably comprises at least a structural element that imposes a flow velocity component transverse to the axial direction of the capsule, e.g. in radial and/or circumferential direction. For example, a tree-like structure may have branches that disturb the flow and create a swirl in the compartment. The thus created swirl comprises velocity components in many directions. For example, the vane like structure may be extend in one direction approximately axially and may extend in another direction at an angle to a radial direction, thereby introducing a vortex or swirl with at least one velocity component transverse to the axial direction to create a disturbance for better dissolving the soluble product. Also a grid-like structure, which for example may be arranged substantially parallel to the entrance and/or the exit of the capsule, creates a vortex or a swirl or an otherwise non-laminar and/or non-linear flow disturbed flow. Such a disturbed flow has velocity components in many directions, in addition to the velocity component in the axial direction from entrance to exit, so dissolving of the soluble product may improve. Many variants and orientations of the disturbing arrangement are possible.

Alternatively and/or additionally, by mixing the soluble product in a limited way with coffee, dissolving of the soluble product may be improved as well.

The additional wall element may be perforate and/or porous to allow fluid passing through and to allow a uniform pressure build up in the capsule, but to prevent passing extractable product there through. Alternatively, the additional wall element may be impermeable to prevent passing fluid and extractable product there through, e.g. when different pressure is to be built up in different compartments of the capsule.

Preferably the exit area is provided with a perforate and/or porous exit filter to allow the prepared beverage to drain there through. Advantageously the exit filter is of biodegradable material. Also the entrance area may be provided with an entrance filter to prevent extractable product spilling from the inner space of the capsule via the entrance area and to allow fluid passing through the entrance filter. Advantageously the entrance filter is of biodegradable material. Also, the capsule and/or the additional wall element may be made of biodegradable material.

In an embodiment, the receptacle comprises bottom piercing means intended for piercing the bottom of an alternative capsule for creating at least one entrance opening for supplying the fluid to the extractable product through said at least one entrance opening, and wherein the bottom of the capsule of the system comprises an entrance filter for supplying the fluid to the extractable product there through, which entrance filter is, in use, positioned at a distance from the bottom piercing means, such that the capsule of the system is not pierced by the bottom piercing means and the bottom stays intact.

In a further embodiment, the receptacle comprises lid piercing means intended for piercing the exit filter of an alternative capsule when the exit area sufficiently presses against the lid piercing means under the influence of the pressure of the fluid and/or beverage in the capsule for creating at least one exit opening through which the beverage can drain from the alternative capsule, and wherein the exit area of the capsule of the system comprises an exit filter, through which the beverage can drain from the capsule of the system such that the capsule of the system, in use, is not pierced by the lid piercing means and the lid stays intact.

In an embodiment, the fluid dispensing device is arranged for supplying the fluid to the exchangeable capsule under a pressure of approximately 4-20 bars, preferably 4.5-18 bars, more preferably 5-15 bars. By providing a relatively high pressure build up in the capsule and/or in a compartment of the capsule, the pressure build up in the capsule may be more controllable and the beverage may be more reproducible.

The invention also relates to a capsule with an additional wall element.

The invention also relates to the use of a capsule with an additional wall element for preparing a beverage using the apparatus of the system.

The invention also relates to a method for preparing a predetermined quantity of beverage suitable for consumption using an extractable product, comprising providing an exchangeable capsule, comprising a circumferential wall, a bottom closing the circumferential wall at a first end, and a lid closing the circumferential wall at a second end opposite the bottom, wherein the wall, bottom and lid enclose an inner space comprising the extractable product, providing an apparatus comprising a receptacle for holding the exchangeable capsule, a fluid dispensing device for supplying an amount of a fluid, such as water, under a pressure of at least four bars to the exchangeable capsule, and an outlet which, in use, is in fluid communication with the capsule for draining the prepared beverage from the capsule and supplying the beverage to a container such as a cup, arranging the exchangeable capsule with the lid in abutment with a support surface of the receptacle, and supplying the fluid under the pressure to the extractable product for preparing the beverage; wherein the capsule comprises at least one additional wall element extending towards the inner space for providing additional stiffness.

BRIEF DESCRIPTION OF THE DRAWINGS

The invention will be further elucidated by means of non-limiting examples referring to a drawing in which.

In this description, identical or corresponding items have identical or corresponding reference numerals. The exemplary embodiments shown should not be construed to be limitative in any manner and serve merely as illustration.

DESCRIPTION OF EXEMPLARY EMBODIMENTS

Figure 1A:
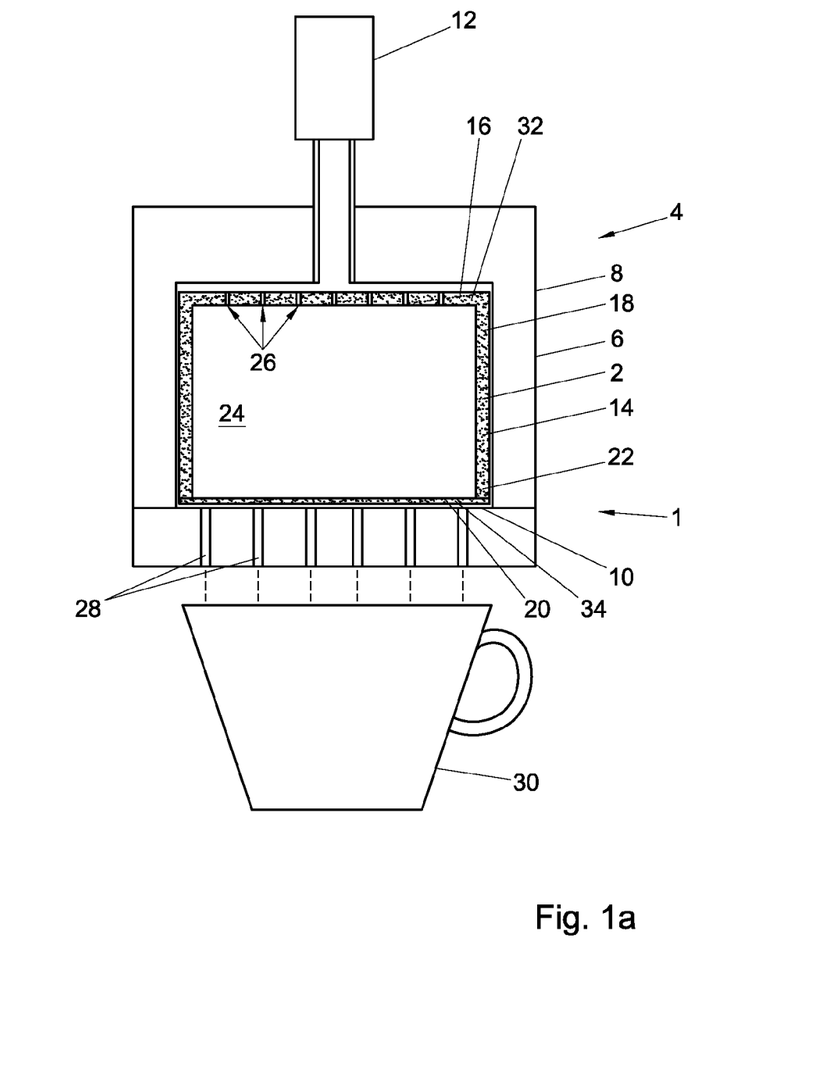
FIG. 1a shows an example of a first embodiment of a system according to the invention.

FIG. 1a shows an example of a first embodiment of a system 1 for preparing a predetermined quantity of beverage suitable for consumption using an extractable product according to the invention. The system 1 comprises an exchangeable open capsule 2, and an apparatus 4. The apparatus 4 comprises a receptacle 6 for holding the exchangeable capsule 2. In FIG. 1a a gap is drawn between the capsule 2 and the receptacle 6 for clarity. It will be appreciated that, in use, the capsule 2 may lie in contact with the receptacle 6. In this example the receptacle 6 has a shape complementary to the shape of the capsule 2. In this example the receptacle 6 comprises an upper part 8 and a support surface 10.

The apparatus 4 further comprises a fluid dispensing device 12 for supplying an amount of a fluid, such as hot water, under a high pressure, of e.g. more than approximately four bars (absolute pressure), to the exchangeable capsule 2.

In the system 1 shown in FIG. 1a, the exchangeable capsule 2 comprises a substantially rigid circumferential wall 14, a bottom 16 closing the circumferential wall 14 at a first end 18, and a lid 20 closing the circumferential wall 14 at a second, open, end 22 opposite the bottom 16. The circumferential first wall 14, the bottom 16 and the lid 20 enclose an inner space 24 comprising the extractable product, in this example roasted and ground coffee. In this example, the exchangeable capsule 2 comprises an amount of extractable product, e.g. approximately 5 grams of roasted and ground coffee, suitable for preparing a single portion of the beverage, preferably a single cup of the beverage, e.g. from 30-200 ml of the prepared beverage. The exchangeable capsule, thus, is a single-portion-pack.

In the example of FIG. 1a, the circumferential first wall 14 is substantially rigid. The circumferential wall 14 may e.g. comprise a plastics material and may be formed by e.g. injection moulding, vacuum-forming, thermoforming or the like.

In this example the bottom 16 is integral with the circumferential wall 14. In this example the bottom 16 is sheet-shaped and comprises a plurality of entrance openings 26 for allowing the fluid to enter the capsule 2.

In this example the lid 20 is flexible and sheet-shaped. Further, in this example the lid 20 is porous. The lid 20 is in this example manufactured from filtering layer. In this example the filtering layer comprises polyethylene (PE) fibres. In this example the lid 20 is connected to the circumferential wall 14 by heat sealing. In this example the lid 20 forms an outermost boundary of the capsule 2 in an axial direction thereof. It can be seen from FIG. 1a that the lid 20 abuts against the support surface 10 of the receptacle 6.

The system 1 shown in FIG. 1a is operated as follows for preparing a cup of coffee.

The capsule 2 is placed in the receptacle 6. The lid 20 is brought into abutment with the support surface 10. The fluid, here hot water under pressure, is supplied to the extractable product in the inner space 24 through the entrance openings 26. The water will wet the coffee grounds and extract the desired substances to form the coffee beverage. The prepared coffee will drain from the capsule 2 through the porous lid 20. The coffee beverage is further drained from the receptacle 6 via a plurality of outlets 28, and may be supplied to a container 30 such as a cup.

In the example of FIG. 1a, the bottom 16 comprises an entrance layer 32 with a plurality of entrance openings 26 which are distributed over substantially the entrance layer 32. In this example the entrance layer 32 forms the bottom 16. The entrance layer 32 has a certain flow resistance determined by e.g. the width, the cross-section and/or the distribution of the entrance openings 26 over the entrance layer 32.

In the example of FIG. 1a the lid 20, forming an exit area of the capsule 2, through which the beverage, here coffee, can drain from the capsule, comprises an exit layer 34. In this example the exit layer 34 forms the lid 20. In this example, the exit layer 34 is formed by a porous sheet, such as a filter layer or a filter paper. In this example the entire lid 20 is formed as the porous sheet exit layer 34. In this example the lid 20 forms a substantially continuous fluid-permeable sheet spanning substantially the entire second open end 22 of the capsule 2. The exit layer 34 has a certain flow resistance determined by e.g. the porosity and/or permeability of the filter layer such as filter paper.

The flow resistance of the exit layer 34 is higher than the flow resistance of the entrance layer 32, to enable a pressure build-up in the capsule 2 before the beverage drains from the capsule 2 via the exit layer 20. Due to the pressure build-up in the capsule 2, the pressure in the capsule 2 may become higher than the pressure with which the hot water is supplied to the capsule 2. The higher pressure in the capsule 2 is favourable for the brewing process and may give a better beverage. Also, the time the hot water is in the capsule 2 to extract beverage from the extractable product may become larger and thus may result in a better beverage. Also, pressure build-up upstream of the capsule may be prevented, which may damage the system 1 and/or is unfavourable for the brewing process.

Figure 1B:
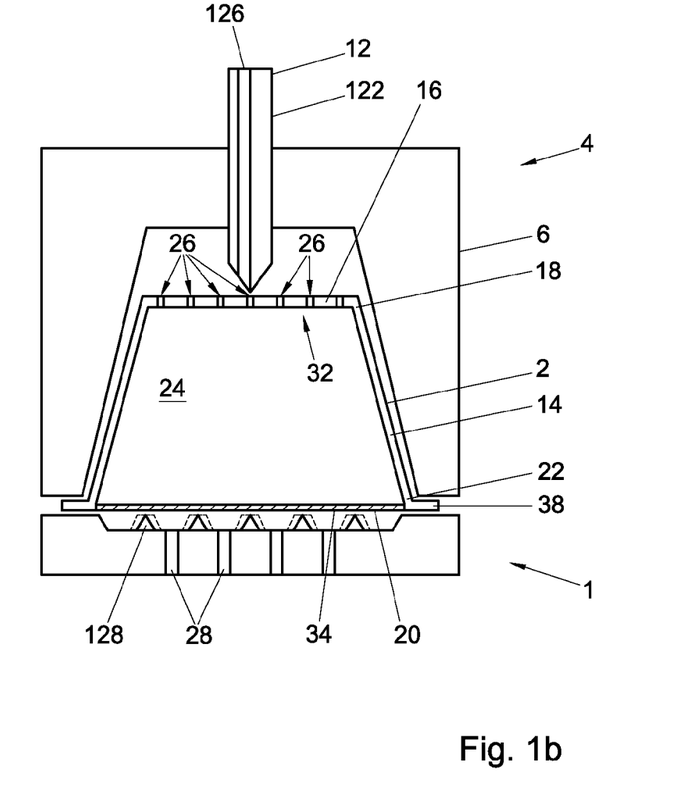
FIG. 1b shows an example of a second embodiment of a system according to the invention.

FIG. 1b shows an example of a second embodiment of a system 1 according to the invention for preparing a predetermined quantity of beverage suitable for consumption using an extractable product. The system 1 comprises an exchangeable capsule 2, and an apparatus 4. The apparatus 4 comprises a receptacle 6 for holding the exchangeable capsule 2. In this example, the receptacle 6 has a shape complementary to the shape of the capsule 2. In FIG. 1b a gap is drawn between the capsule 2 and the receptacle 6 for clarity. It will be appreciated that, in use, the capsule 2 may lie in contact with the receptacle 6. The apparatus 4 further comprises a fluid dispensing device 12 for supplying an amount of a fluid, such as water, under pressure to the exchangeable capsule 2.

In the system 1 shown in FIG. 1b, the exchangeable capsule 2 comprises a circumferential wall 14, a bottom 16 closing the circumferential wall 14 at a first end 18, and a lid 20 closing the circumferential wall 14 at a second end 22 opposite the bottom 16. The circumferential wall 14, the bottom 16 and the lid 20 enclose an inner space 24 comprising the extractable product. In this example, the exchangeable capsule 2 comprises an amount of extractable product suitable for preparing a single portion of the beverage, preferably a single cup of the beverage, e.g. from 30-200 ml of the prepared beverage. The exchangeable capsule, thus, is a single-portion-pack. Approximately a capsule may filled with 4-8 gram roasted and ground coffee. The grain size of the coffee may e.g. be between 0.2 and 0.4 mm for approximately 5 gram of ground coffee in the capsule 2.

In this embodiment, the bottom 16 comprises an entrance layer 32 with entrance openings 26 distributed over the entrance layer 32, which are distributed over substantially the entire bottom 16. In the example of FIG. 1b the bottom 16 is integral with the circumferential wall 14.

In this embodiment, the system 1 of FIG. 1b comprises bottom piercing means 122 intended for piercing a capsule. FIG. 1b shows the bottom piercing means 122 in an extended position, intended for creating an entrance opening in the bottom 16 of a capsule. However, here the bottom 16 of the capsule 2 is positioned at a distance from the bottom piercing means 122, such that the capsule 2 is not pierced by the bottom piercing means 122 and the bottom 16 stays intact when the bottom piercing means 122 are brought in the extended position.

In FIG. 1*b* the bottom piercing means 122 comprise a bore 126 through which the fluid is supplied to an inner space of the receptacle 6. The fluid, here hot water under a pressure of e.g. more than four bars, will flow through the entrance layer 32 into the inner space 24 of the capsule 2 for extracting desired substances from the extractable product, in this example approximately 5 grams of roasted and ground coffee, for preparing, in this example the single cup of the beverage, here coffee. The flow resistance of the entrance layer 32 usually is sufficiently low such that no pressure build-up upstream of the entrance layer in the receptacle 6 or the bore 126 may be possible, which may have a negative influence on the system 1 and/or the beverage.

In the example of FIG. 1*b*, the circumferential wall 14 is substantially rigid. The circumferential wall 14 may e.g. comprise a plastics material and may be formed by e.g. injection moulding, vacuum-forming, thermoforming or the like.

Further, the system 1 shown in FIG. 1*b* may comprise lid piercing means 128 intended for piercing the lid of an alternative capsule. However, the lid 20 of the capsule 2 comprises an exit layer 34, through which the beverage can be drained from the capsule 2. The exit layer 34 is arranged to having sufficiently high tear strength and/or to be sufficiently stiff not to be pierced by the lid piercing means 128 under the influence of the pressure inside the capsule 2. However, the exit layer 34 may be deformed against the top sides of the piercing means under influence of the pressure in the capsule, but will not rupture and/or tear and/or be pierced by the piercing means.

In the example of FIG. 1*b* the exit layer 34, forming an exit area of the capsule 2, through which the beverage, here coffee, can drain from the capsule, is formed by a porous sheet, such as filter paper or a filter layer of an alternative material. In this example the exit layer 34 is positioned in the exit area of the lid 20. The exit layer 34 may form a substantially continuous fluid-permeable sheet spanning substantially the entire second, open end 22 of the capsule 2. Thus, the fluid can drain from the capsule 2 over a large area.

Figure 2:
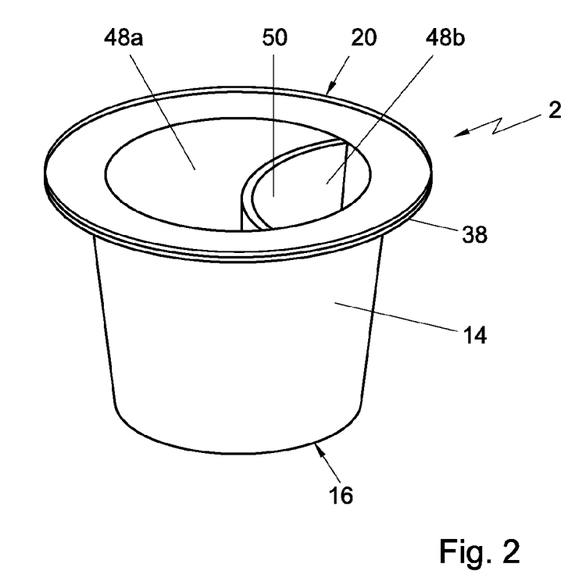
FIG. 2 shows a first embodiment of the capsule according to the invention.

FIG. 2 shows an embodiment of a capsule 2 according to the invention, wherein the capsule 2 comprises an additional wall element 50. The additional wall element 50 provides additional stiffness to the capsule 2. The additional wall element 50 may extend from the bottom 16 to the lid 20. The additional wall element 50 extends from the circumferential wall 14 towards the inner space of the capsule. In this embodiment the additional wall 50 divides the inner space 24 of the capsule 2 in two compartments 48*a* and 48*b*. For example can one compartment 48*a* be filled with extractable product and the second compartment 48*b* can remain empty. This way an optimal volume for the extractable product, e.g. roasted and ground coffee, may be created, so an optimal compaction of the extractable product may be obtained. In an other embodiment, the second compartment 48*b* may be filled with an other extractable product e.g. a different kind of coffee, or e.g. cream, or with a soluble product, e.g. milk or cacao. The additional wall 50 may be porous and/or perforate or may be impermeable as not to mix the products in both compartments. Also, the pressure to be built up in the compartments may be different. For example, in one compartment 48*a* filled with roasted and ground coffee, the pressure to be build up is lower than in the compartment 48*b* filled with e.g. cream. Thus the container 30 will be first filled with the coffee liquid and thereafter filled with the cream. The properties of the additional wall element 50, the wall 14, and the lid 20 with exit filter 36 may have to be adapted such as to accommodate the different pressure levels in the different compartments.

Figure 3:
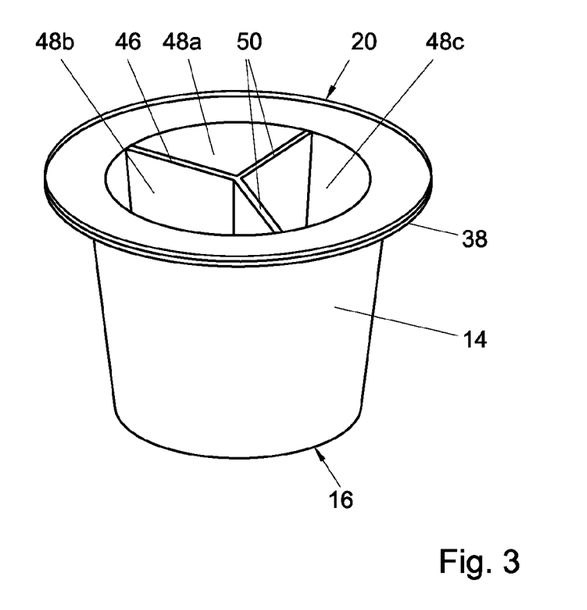
FIG. 3 shows a second embodiment of the capsule according to the invention.

FIG. 3 shows another embodiment of the capsule 2 according to the invention, comprising additional wall elements 50 dividing the inner space 24 of the capsule in three compartments 48*a*, 48*b* and 48*c*. Each compartment may be filled with a different extractable and/or soluble product, such as roasted and ground coffee, cream and/or liquor flavoured extractable product. The pressure built-up in the different compartments may be different, e.g. to create a beverage that is drained into layers in the container 30 for an attractive serving of the beverage or a particular taste experience. Also, the additional wall elements 50 may provide additional stiffness to the capsule 2. The wall 14, the lid 20 and/or the bottom 16 may thus be provided less stiff, which may result in an easier to manufacture and/or more cost effective capsule 2.

Figure 4A:
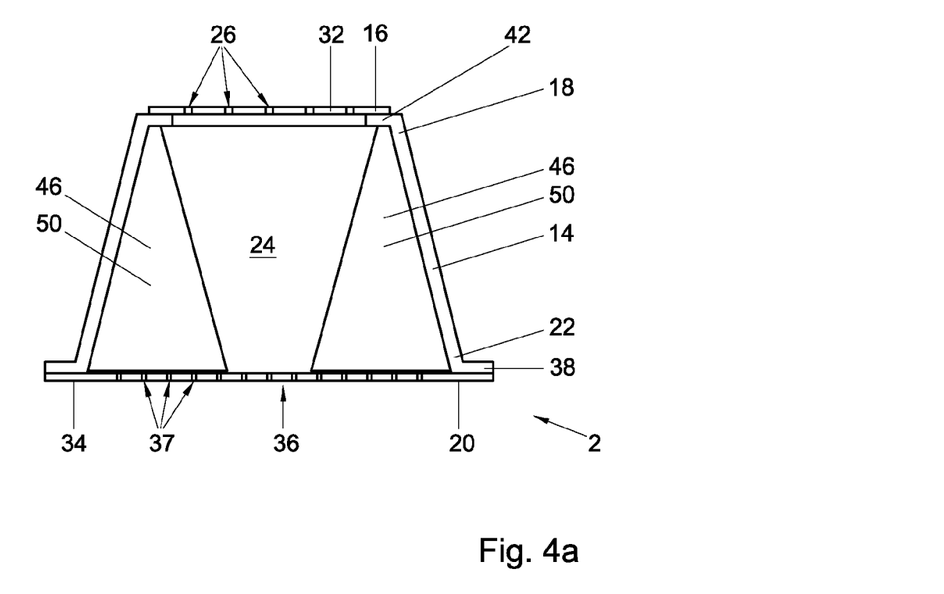
FIGS. 4a and 4b show a third embodiment of the capsule according to the invention.
Figure 4B:
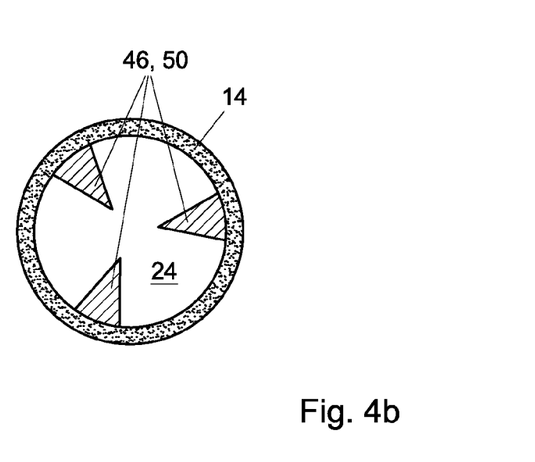

FIG. 4 shows an embodiment of a capsule according to the invention that comprises additional wall elements 50 in the form of wedge-shaped ribs 46. The cross-section of the ribs 46 increases from the bottom 16 towards the lid 20. The lid 20 comprises an exit filter 36 with exit openings 37 for draining the prepared beverage there through. The ribs 46 may provide additional stiffness to the circumferential wall 14. Preferably the circumferential wall 14 is substantially rigid. By providing additional wall elements 50 attached to the circumferential wall 14 and extending towards the inner space 24, additional stiffness may be provided to the circumferential wall 14, so a more stiff and rigid circumferential wall may be obtained. One or more additional wall elements 50 may be provided. Different shapes of the additional wall element 50 may be provided, such as for example wedge-shaped, rectangular, circular, polygonal. Also, the volume of the additional wall elements 50 may be such that the remaining volume of the inner space 24 is optimal for providing sufficient extractable product in an optimal compaction. Thus the volume of the inner space may be adapted by the additional wall elements depending on the extractable product. When the capsule 2 is provided with an entrance filter 32 and an exit layer 34, the inner space 24 of the capsule may be adapted by the additional wall elements 50 to be entirely filled with extractable product so that no air volume is present in the capsule, thereby improving the shelf life of the extractable product in the capsule. The capsule 2 can be properly sealed, for example by a biodegradable seal.

Also, the additional wall element 50, e.g. the rib 46 may be provided with a bore facing the bottom and ending at or near the lid or in between the lid and the bottom. The bore is open for letting water therein, such that for example, the extractable product can also be wetted at a level below the bottom entrance area in addition to the extractable product being wetted by the fluid through the bottom entrance area. This way for example a more uniform pressure build up may be obtained.

In the foregoing specification, the invention has been described with reference to specific examples of embodiments of the invention. It will, however, be evident that various modifications and changes may be made therein without departing from the broader spirit and scope of the invention as set forth in the appended claims.

It may be clear that the compartments may be arranged circumferentially next to each other, or may be arranged axially next to each other. Many variants and combinations of compartment arrangement are possible.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A system for preparing a predetermined quantity of beverage suitable for consumption using an extractable product, the system comprising:
   an exchangeable capsule, and
   an apparatus comprising a receptacle for holding the exchangeable capsule, and a fluid dispensing device for supplying an amount of a fluid under pressure to the exchangeable capsule,
   wherein the exchangeable capsule comprises a circumferential wall, a bottom closing the circumferential wall at a first end, and a lid closing the circumferential wall at a second end opposite the bottom, wherein the circumferential wall, the bottom and the lid enclose an inner space comprising the extractable product,
   wherein the exchangeable capsule comprises an entrance area and the system is arranged for bringing the fluid dispensing device in fluid connection with the entrance area for supplying the fluid to the inner space for preparing the beverage,
   wherein the exchangeable capsule comprises an exit area and the system comprises an outlet which is in fluid communication with the exit area for draining the prepared beverage from the exchangeable capsule and supplying the beverage to a container,
   wherein the receptacle is arranged for draining the prepared beverage from the exchangeable capsule through the exit area,
   wherein the circumferential wall comprises at least one additional wall element extending towards the inner space, wherein the bottom comprises the entrance area, wherein the lid comprises the exit area, wherein the fluid dispensing device is arranged for supplying fluid to the extractable product under a pressure of 4-20 bars, and wherein the additional wall element forms a rib for providing additional stiffness,
   wherein the receptacle comprises bottom piercing means intended for piercing the bottom of an alternative capsule for creating at least one entrance opening for supplying the fluid to the extractable product through said at least one entrance opening, and
   wherein the bottom of the exchangeable capsule comprises an entrance filter for supplying the fluid to the extractable product there through, which entrance filter is, in use, positioned such that the exchangeable capsule is not pierced by the bottom piercing means and the bottom stays intact.

2. The system according to claim 1, wherein the circumferential wall is substantially rigid.

3. The system according to claim 1, wherein the additional wall element extends from the bottom to the lid of the exchangeable capsule.

4. The system according to claim 1, wherein the additional wall element comprises a bore at an end facing the bottom for letting fluid therein.

5. The system according to claim 1, wherein the additional wall element divides the inner space in two or more compartments.

6. The system according to claim 5, wherein at least one compartment comprises the extractable product.

7. The system according to claim 5, wherein the two or more compartments comprise different extractable and/or soluble products.

8. The system according to claim 1, wherein the rib is wedge-shaped.

9. The system according to claim 8, wherein the cross-section of the wedge-shaped rib increases from the bottom towards the lid.

10. The system according to claim 1, wherein the exit area is provided with at least one of a porous and perforate exit filter.

11. The system according to claim 1, wherein the entrance area is provided with at least one of a porous and perforate entrance filter.

12. The system according to claim 1, wherein the receptacle comprises lid piercing means intended for piercing an exit filter of the alternative capsule when the exit area sufficiently presses against the lid piercing means under the influence of the pressure of the fluid in the alternative capsule for creating at least one exit opening through which the beverage can drain from the alternative capsule, and
   wherein the exit area of the exchangeable capsule comprises an exit filter, through which the beverage can drain from the exchangeable capsule such that the exchangeable capsule is not pierced by the lid piercing means and the lid stays intact.

13. The system according to claim 1, wherein the fluid dispensing device is arranged for supplying the fluid to the exchangeable capsule under a pressure of approximately 4.5-18 bars.

14. A capsule of the system according to claim 1.

15. The system of claim 1, wherein the additional wall element further comprises at least one of perforate and porous sides.

16. The system according to claim 1, wherein the fluid dispensing device is arranged for supplying the fluid to the exchangeable capsule under a pressure of approximately 5-15 bars.

17. The system of claim 1, wherein the additional wall element extends from the circumferential wall towards the inner space, and wherein the additional wall element extends only partially across the inner space.

* * * * *